(12) United States Patent
Minamiura et al.

(10) Patent No.: US 10,303,395 B2
(45) Date of Patent: May 28, 2019

(54) STORAGE APPARATUS

(71) Applicant: FUJITSU LIMITED, Kawasaki-shi, Kanagawa (JP)

(72) Inventors: Kiyoto Minamiura, Koto (JP); Hiroshi Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 15/255,450

(22) Filed: Sep. 2, 2016

(65) Prior Publication Data

US 2017/0090770 A1 Mar. 30, 2017

(30) Foreign Application Priority Data

Sep. 25, 2015 (JP) .................................. 2015-187554

(51) Int. Cl.
*G06F 3/06* (2006.01)
(52) U.S. Cl.
CPC ............ *G06F 3/065* (2013.01); *G06F 3/0619* (2013.01); *G06F 3/0673* (2013.01)
(58) Field of Classification Search
CPC .... G06F 3/065; G06F 11/1435; G06F 3/0683; G06F 3/0619; G06F 3/0643; G06F 3/0673
USPC ........................................................ 711/162
See application file for complete search history.

(56) References Cited

U.S. PATENT DOCUMENTS

| | | | |
|---|---|---|---|
| 2005/0228945 A1 | 10/2005 | Nagata | |
| 2007/0061539 A1 | 3/2007 | Nonaka et al. | |
| 2009/0113151 A1* | 4/2009 | Teranishi | G06F 21/564 |
| | | | 711/162 |

(Continued)

FOREIGN PATENT DOCUMENTS

| | | |
|---|---|---|
| JP | 2002-278819 | 9/2002 |
| JP | 2005-301499 | 10/2005 |
| JP | 2007-79774 | 3/2007 |
| JP | 2009-146381 | 7/2009 |

(Continued)

OTHER PUBLICATIONS

"Demand of network connection stimulates technical innovation", Cliff Miller, Evolving storage (latter part), Japan, Nikkei BP, May 20, 2002, No. 548, pp. 158-164.
Japanese Office Action dated Mar. 12, 2019 issued in corresponding Japanese Patent Appiication No. 2015-187554.

*Primary Examiner* — Hashem Farrokh
(74) *Attorney, Agent, or Firm* — Staas & Halsey LLP

(57) ABSTRACT

A storage apparatus includes a memory device and a processor. The memory device stores therein first management information regarding a first backup for each generation. The first backup is backup of a file stored in a storage device. The first management information includes first identification information indicating presence or absence of update of the file in association with metadata corresponding to the file. The processor is configured to receive a first request to perform first update of updating the file. The processor is configured to store, upon receiving the first request, a first copy of the file before the first update in a predetermined first area. The processor is configured to perform the first update upon storing the first copy. The processor is configured to register, as the first identification information, update information indicating presence of update of the file in the first management information in association with the metadata.

8 Claims, 12 Drawing Sheets

(56) References Cited

U.S. PATENT DOCUMENTS

| | | | |
|---|---|---|---|
| 2011/0246736 A1* | 10/2011 | Ueda | G06F 11/1451 |
| | | | 711/162 |
| 2016/0077926 A1* | 3/2016 | Mutalik | G06F 11/1456 |
| | | | 711/162 |
| 2016/0147607 A1* | 5/2016 | Dornemann | G06F 11/1435 |
| | | | 711/162 |

* cited by examiner

FIG.6

| BITMAP TABLE | | | |
|---|---|---|---|
| BLOCK NUMBER | UPDATE INFORMATION | | |
| | FIRST GENERATION | SECOND GENERATION | THIRD GENERATION |
| 1 | 0 | 0 | 0 |
| 2 | 1 | 0 | 0 |
| ... | ... | ... | ... |
| 12 | 0 | 1 | 0 |
| 13 | 1 | 0 | 1 |
| ... | ... | ... | ... |

| BITMAP TABLE | | | | |
|---|---|---|---|---|
| METADATA | LATEST UPDATED GENERATION | UPDATE INFORMATION | | |
| | | FIRST GENERATION | SECOND GENERATION | THIRD GENERATION |
| 1 | 0 | 0 | 0 | 0 |
| 2 | 1 | 1 | 0 | 0 |
| 3 | 2 | 0 | 1 | 0 |
| 4 | 1 | 1 | 0 | 0 |
| 5 | 3 | 0 | 0 | 1 |
| ... | ... | ... | ... | ... |

112a 112b 112c

STORAGE APPARATUS

CROSS-REFERENCE TO RELATED APPLICATION

This application is based upon and claims the benefit of priority from the prior Japanese Patent Application No. 2015-187554, filed on Sep. 25, 2015, the entire contents of which are incorporated herein by references.

FIELD

The embodiments discussed herein are related to a storage apparatus.

BACKGROUND

A storage apparatus is used for data preservation. The storage apparatus is equipped with a plurality of storage devices such as hard disk drives (HDDs) or solid state drives (SSDs) and makes it possible to use a storage area of a large capacity.

There is a technique that acquires a backup of data preserved in a storage apparatus. For example, a snapshot is a method for acquiring a backup. In the snapshot, when update of data is intended after a backup is acquired at a certain time point, data before the update with respect to the updated data is saved to be kept in the storage device. For example, there is a suggestion to use a differential bitmap having bits associated with blocks within a logical unit in order to manage, in units of blocks, whether or not data is saved and recorded (i.e., updated).

Also, there is a suggested technique that manages a snapshot image for each generation by preserving a snapshot image reflecting up to N generations and history information including updated data of $N+1^{th}$ generation, $N+2^{th}$ generation . . . as updated data with respect to the image.

There is also a suggested technique that builds a single file system in a consolidated storage area obtained by consolidating a first storing area and a second storing area. In the suggested technique, metadata (e.g., inode) related to a file are stored only in the first storing area when storing the file, and thus, the metadata is not newly prepared but just changed when the file is moved.

Related techniques are disclosed in, for example, Japanese Laid-Open Patent Publication No. 2005-301499, Japanese Laid-Open Patent Publication No. 2002-278819, and Japanese Laid-Open Patent Publication No. 2007-079774.

SUMMARY

According to an aspect of the present invention, provided is a storage apparatus including a memory device and a processor. The memory device is configured to store therein first management information regarding a first backup for each generation. The first backup is backup of a file stored in a storage device. The first management information includes first identification information indicating presence or absence of update of the file in association with metadata corresponding to the file. The processor is configured to receive a first request to perform first update of updating the file. The processor is configured to store, upon receiving the first request, a first copy of the file before the first update in a predetermined first area. The processor is configured to perform the first update upon storing the first copy. The processor is configured to register, as the first identification information, update information indicating presence of update of the file in the first management information in association with the metadata.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a bitmap table in units of blocks;

FIG. 7 is a diagram illustrating an example of a bitmap table in units of metadata;

DESCRIPTION OF EMBODIMENTS

In recent years, a storage apparatus capable of receiving both a block-based access and a file-based access is used. In the storage apparatus, there is a room for improvement on the management information used for a backup management by the snapshot. For example, the presence/absence of data update is managed in units of blocks by the differential bitmap as described above in the snapshot of the storage apparatus that receives the block-based access. For that reason, there is a problem that the size of the differential bitmap becomes larger as the number of blocks to be managed increases.

Hereinafter, description will be made on embodiments disclosed in the present disclosure with reference to the accompanying drawings.

First Embodiment

Figure 1:
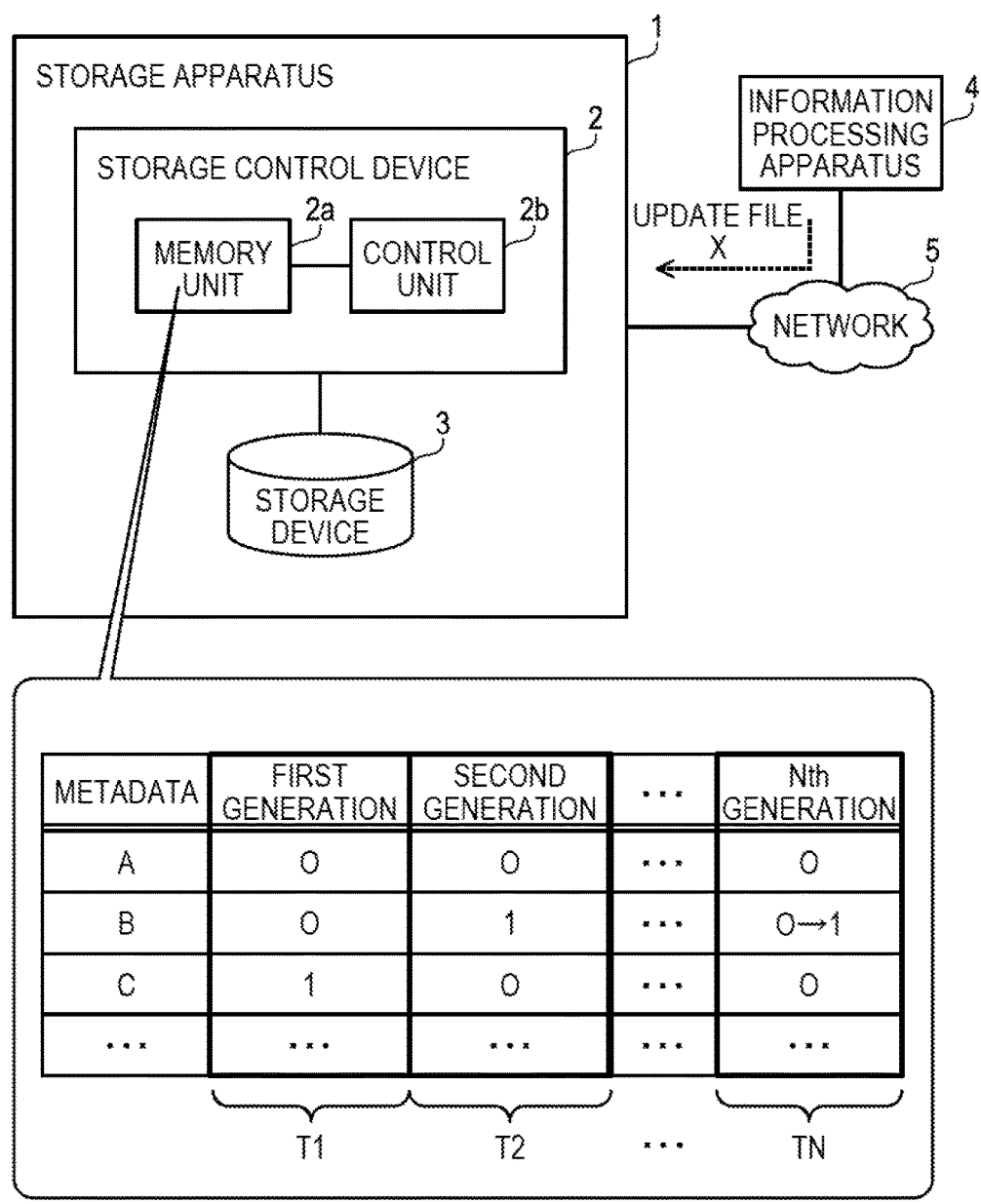
FIG. 1 is a diagram illustrating a storage apparatus according to a first embodiment.

FIG. 1 is a diagram illustrating a storage apparatus according to a first embodiment. A storage apparatus 1 includes a storage control device 2 and a storage device 3. The storage control device 2 controls data access to the storage device 3. An HDD or an SSD may be used as the storage device 3. The storage apparatus 1 may include a plurality of storage devices 3. The storage apparatus 1 is coupled with an information processing apparatus 4 through a network 5. For example, the storage device 3 stores therein data used for the processing performed by the information processing apparatus 4. The storage control device 2 is equipped with a file system function and permits file-based access by the information processing apparatus 4.

The storage apparatus 1 acquires a backup of data stored in the storage device 3 and performs a generation management for the acquired backup. The storage apparatus 1 acquires the backup by the snapshot technique. A method used by the storage apparatus 1 to acquire a backup may be referred to as a copy-on-write. A backup management function of the storage apparatus 1 is provided by the storage control device 2.

The storage control device 2 includes a memory unit 2a and a control unit 2b. The memory unit 2a may be a volatile memory device such as a random access memory (RAM) or a nonvolatile memory device such as a flash memory. The control unit 2b is, for example, a processor. The processor may include, for example, a central processing unit (CPU), a digital signal processor (DSP), an application specific integrated circuit (ASIC), and a field programmable gate array (FPGA). The control unit 2b may be a multiprocessor.

The memory unit 2a stores therein the management information of each generation of the backup. In the management information, the identification information indicating the presence/absence of update of each file is associated with the metadata that are associated with each of a plurality of files stored in the storage device 3. The identification information may be bit information that, for example, "0" indicates the absence of update of the file and "1" indicates the presence of update of the file. The metadata is information associated with a plurality of blocks indicating physical storage locations on the storage device 3 in which the file is stored. For example, the metadata may be an inode number managed by a file system or a hash value of a path of the file.

The control unit 2b receives an instruction (backup acquisition instruction) for acquiring a backup. The backup acquisition instruction may be transmitted from the information processing apparatus 4 or from another apparatus. When the backup acquisition instruction is received, the control unit 2b generates management information of a corresponding generation and stores the management information in the memory unit 2a.

For example, it is assumed that the management information T1, T2, . . . for each of the first generation, the second generation, . . . , and the N$-1^{th}$ generation (N is an integer of two or more), respectively, are stored in the memory unit 2a. The higher generation number indicates newer generation. When the backup acquisition instruction is received, the control unit 2b generates management information TN of the N$^{th}$ generation and stores the management information TN in the memory unit 2a. When the management information TN is generated, all pieces of identification information included in the management information TN indicate the "absence of update" (e.g., "0").

When an update request for a certain file is received, the control unit 2b performs the update after storing a copy of the file before the update, and registers, in the management information for the backed-up generation in the memory unit 2a, the fact that the file has been updated in association with the metadata of the file.

For example, the control unit 2b receives an update request for a file X from the information processing apparatus 4. It is assumed that the metadata associated with the file X is "B". The control unit 2b copies the file X to be updated and stores the copied file X, which is not updated, in a predetermined storage area of the storage device 3 or another storage device. Thus, the control unit 2b stores a copy of the file X before the update. At this time, the control unit 2b records information for identifying a storage destination of the copy of the file X associated with the metadata "B".

The control unit 2b then performs the update in response to the file update request. For example, the control unit 2b updates the file X of a copy source with respect to the stored copy. The updated file of the file X is assumed as a file Xa. The control unit 2b changes the identification information associated with the metadata "B" in the management information TN from the "absence of update" to the "presence of update" (e.g., changes from "0" to "1"). Thereafter, even when an update request for the file Xa associated with the metadata "B" is received, the control unit 2b performs the file update without updating the identification information of the metadata "B" in the management information TN or storing the copy of the file Xa until an acquisition of a backup of next generation is instructed.

As a result, when an instruction to restore a backup of the N$^{th}$ generation onto the storage device 3 is received from the information processing apparatus 4, the storage apparatus 1 may perform the restoration on the basis of the management information TN. Specifically, the control unit 2b refers to the management information TN to identify that a copy of the file X is saved at the timing when the instruction to acquire the backup of the N$^{th}$ generation with respect to the metadata "B" is received. The information of a storage destination of the copy of the file X is recorded in the memory unit 2a, and thus, the control unit 2b may acquire the copy of the file X on the basis of the recorded information and restore the file X. Other files are also managed similarly to the file X, and thus, a state of the N$^{th}$ generation of each file stored in the storage device 3 may be restored.

According to the storage apparatus 1, the size of the management information for the backup may be reduced. Details are as follows. For example, it may be also considered that the piece of identification information is managed in association with each of a plurality of blocks associated with physical storage locations on the storage device 3. However, in this method, the size of the management information becomes larger as the number of blocks to be managed increases.

In particular, a storage apparatus (may be referred to as a unified type storage apparatus) capable of receiving both the block-based access and the file-based access has been utilized in recent years. The storage apparatus may be used as a file server and accessible from a plurality of client apparatuses. Then, there is a possibility that a range of blocks to be backed up is enlarged or the number of generations is increased, compared to a case where only the block-based access is received. Accordingly, an increase in the size of the management information is likely to be significant.

Accordingly, in the storage apparatus 1, the management information in which the metadata of a file is associated with the identification information indicating the presence/absence of file update is used in order to manage an update situation of the data stored in the storage device 3. The metadata is information associated with a plurality of blocks. For that reason, the size of management information may be reduced, compared to a case where the identification information is allocated for each of the plurality of blocks. For example, it is assumed that the size per block is 512 bytes, and the size of the file X is 6 kilobytes. In this case, the file X amounts to 12 blocks. That is, it is possible to reduce the quantity of information for managing update situation of 12 blocks to $1/12$ in a case where the identification information is allocated for units of metadata of a file as compared to a case where the identification information is allocated for units of blocks. In this way, the size of the management information may be reduced.

Second Embodiment

Figure 2:
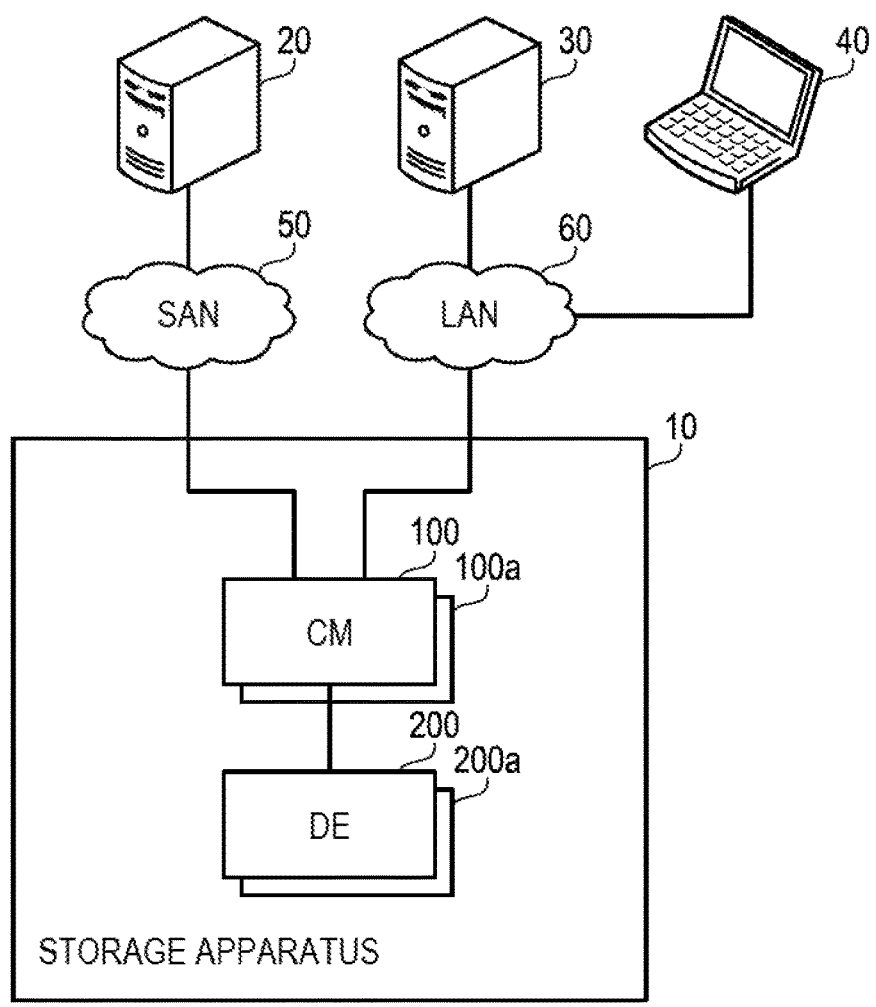
FIG. 2 is a diagram illustrating an information processing system according to a second embodiment.

FIG. 2 is a diagram illustrating an information processing system according to a second embodiment. The information processing system according to the second embodiment includes a storage apparatus 10, business servers 20 and 30, and a client apparatus 40. The storage apparatus 10 and the business server 20 are coupled with a storage area network (SAN) 50. The storage apparatus 10, the business server 30, and the client apparatus 40 are coupled with a local area network (LAN) 60.

The storage apparatus 10 is provided with a plurality of HDDs and stores therein data used for the business processing performed by the business servers 20 and 30, and the client apparatus 40. The storage apparatus 10 may be provided with another type of storage device such as the SSD, instead of the HDD or along with the HDD.

The storage apparatus 10 is a unified type storage apparatus capable of receiving both the block-based access via the SAN 50 and the file-based access via the LAN 60. The storage apparatus 10 includes controller modules (CMs) 100 and 100a and drive enclosures (DEs) 200 and 200a. The CMs 100 and 100a are storage control devices that control the data access to HDDs accommodated in the DEs 200 and 200a. The DEs 200 and 200a are cases for accommodating a plurality of HDDs. For example, in the storage apparatus 10, the CMs 100 and 100a and the DEs 200 and 200a are configured in redundancy to be able to continue operating even when a malfunction occurs in any of these components.

The business server 20 is a server computer that accesses data stored in the storage apparatus 10. The business server 20 performs the block-based access to the storage apparatus 10 through, for example, the SAN 50.

The business server 30 is a server computer that accesses data stored in the storage apparatus 10. The business server 30 performs the file-based access to the storage apparatus 10 through, for example, the LAN 60.

The client apparatus 40 is a client computer operated by a user. The client apparatus 40 performs the file-based access to the storage apparatus 10 through, for example, the LAN 60. For example, the user may execute predetermined application software in the client apparatus 40 and store a file prepared by the execution of the application software in the storage apparatus 10.

The CM 100 combines a plurality of HDDs equipped in the DE 200 with each other to prepare a logical volume by a redundant array of inexpensive disks (RAID) technique. The logical volume is a unit of storage area provided to the business servers 20 and 30 and the client apparatus 40 by the CM 100. A logical unit number (LUN) identifying a logical volume is allocated to the logical volume. The business server 20 may directly designate the LUN and a block address (LBA: Logical Block Address) in the logical volume and perform the data access (block-based access) to the storage apparatus 10. The business server 30 and the client apparatus 40 may perform the file-based access to the data stored in the logical volume of the storage apparatus 10 through the file systems of the business server 30, the client apparatus 40, and the storage apparatus 10.

For that reason, the storage apparatus 10 may use a certain logical volume as a logical volume for the block-based access by the business server 20 and a separate logical volume as a logical volume for the file-based access by the business server 30 and the client apparatus 40. In the latter case, the storage apparatus 10 may be used as, for example, a network attached storage (NAS) and function as a file server for the business server 30 and the client apparatus 40. The storage apparatus 10 may use, for example, a network file system (NFS) or a common internet file system (CIFS) as a protocol for sharing a file.

Figure 3:
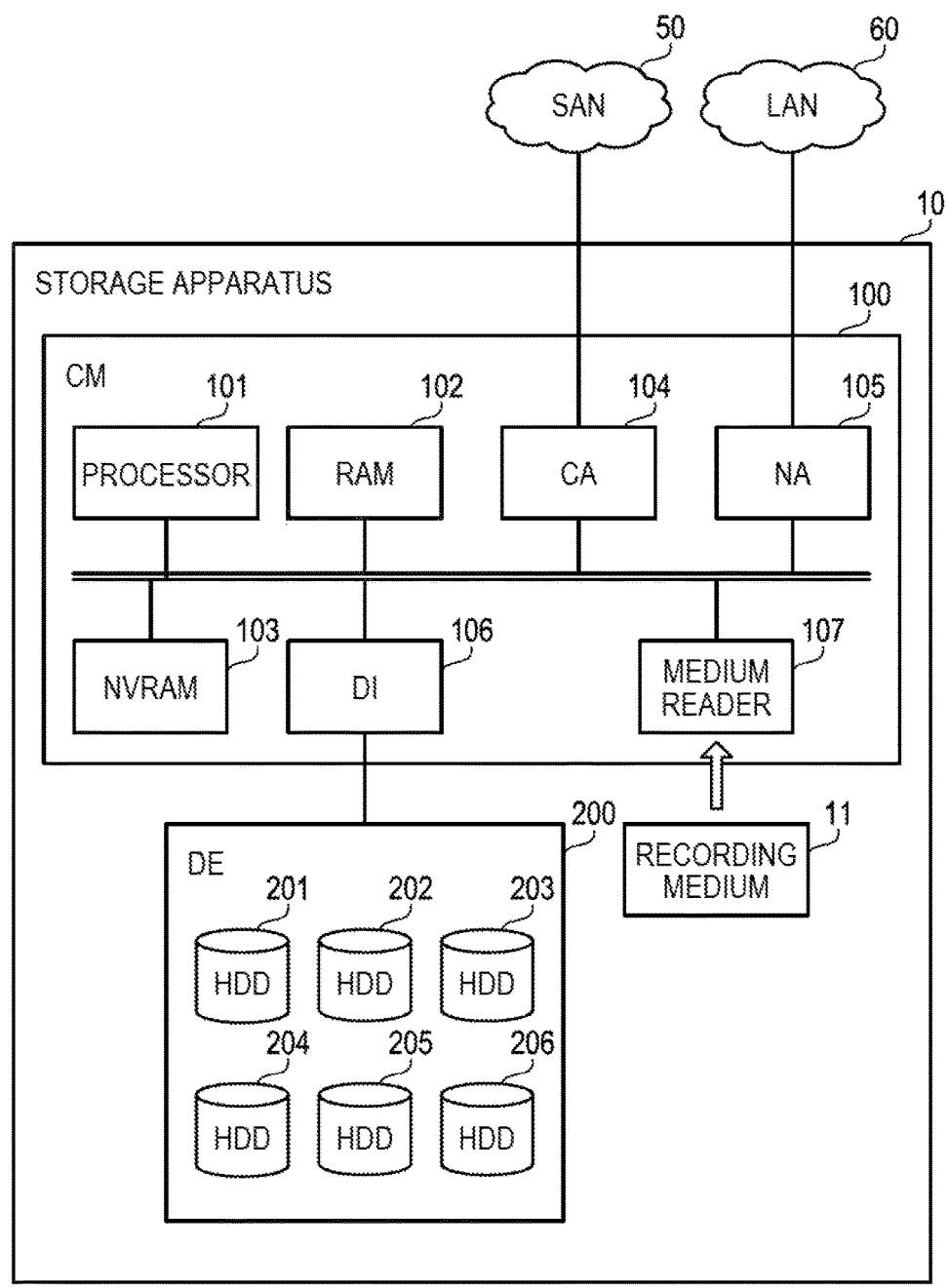
FIG. 3 is a diagram illustrating an exemplary hardware configuration of a CM.

FIG. 3 is a diagram illustrating an exemplary hardware configuration of a CM. The CM 100 includes a processor 101, an RAM 102, a nonvolatile RAM (NVRAM) 103, a channel adapter (CA) 104, a network adapter (NA) 105, a drive interface (DI) 106, and a medium reader 107. Each of the units is coupled with a bus of the CM 100. The CM 100a may also be implemented by a similar hardware configuration to that of the CM 100.

The processor 101 controls the information processing of the CM 100. The processor 101 may be a multiprocessor. The processor 101 is, for example, a CPU, a DSP, an ASIC, or an FPGA. The processor 101 may be a combination of two or more of the CPU, the DSP, the ASIC, and the FPGA.

The RAM 102 is a main memory device of the CM 100. The RAM 102 temporarily stores therein at least a portion of a program of firmware executed by the processor 101. The RAM 102 also stores therein various data used for the processing performed by the processor 101.

The NVRAM 103 is an auxiliary memory device of the CM 100. The NVRAM 103 is, for example, a nonvolatile semiconductor memory. The NVRAM 103 stores therein a program of firmware and various data.

The CA 104 is a communication interface for communicating with the business server 20 through the SAN 50. An interface such as an internet small computer system interface (iSCSI) or a fibre channel (FC) may be used as the CA 104.

The NA 105 is a communication interface for communicating with the business server 30 and the client apparatus 40. An interface such as the Ethernet (registered trademark) may be used as the NA 105.

The DI 106 is an interface for communicating with the DE 200. An interface such as a serial attached SCSI (SAS) may be used as the DI 106. The DI 106 is coupled with the DE 200a to communicate with the DE 200a.

The medium reader 107 is an apparatus for reading a program or data recorded in a portable recording medium 11. A nonvolatile semiconductor memory such as a flash memory may be used as the recording medium 11. The medium reader 107 may store the program or data read from the recording medium 11 in the RAM 102 or the NVRAM 103 in accordance with, for example, an instruction from the processor 101.

The DE 200 includes a plurality of HDDs. For example, the DE 200 includes the HDDs 201, 202, 203, 204, 205, and 206. The logical volume prepared by the respective HDDs is used as a shared area. Types of accesses received with respect to the shared area are different depending on each logical volume. For example, a first logical volume prepared by the HDDs 201, 202, and 203 provides a shared area for block-based access. A second logical volume prepared by the HDDs 204, 205, and 206 provides a shared area for file-based access. Similar to the DE 200, the DE 200a is also provided with a plurality of HDDs. As described above, the DEs 200 and 200a may be provided with other storage devices such as an SSD, instead of the HDD or along with the HDD.

The CM 100 is provided with an interface for coupled with the CM 100a and may perform a data access in cooperation with the CM 100a. For example, the CM 100 and the CM 100a may be used as an active system and a standby system, respectively. Otherwise, both the CM 100 and the CM 100a may be used as the active systems, and the data access may be performed by being distributed in the CMs 100 and 100a. In either case, when one of the CMs 100 and 100a is in a failure state, the other of the CMs 100 and 100a may take over the data access, and a task of the user may be prevented from stopping.

Figure 4:
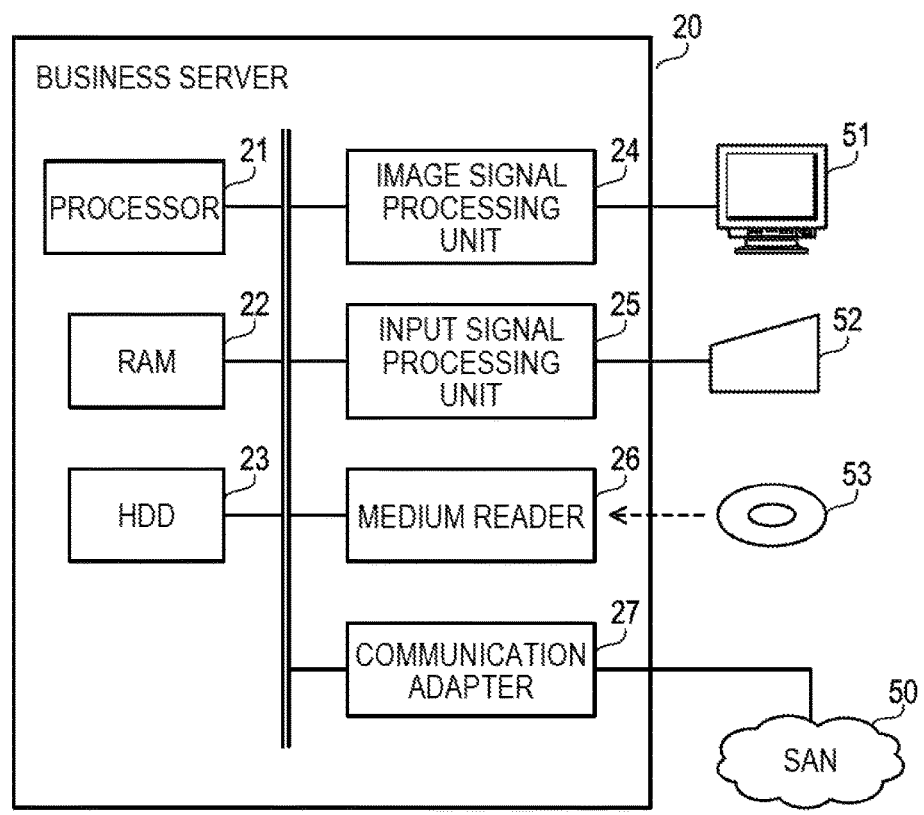
FIG. 4 is a diagram illustrating an exemplary hardware configuration of a business server.

FIG. 4 is a diagram illustrating an exemplary hardware configuration of a business server. A business server 20 includes a processor 21, an RAM 22, an HDD 23, an image signal processing unit 24, an input signal processing unit 25, a medium reader 26, and a communication adapter 27. Each unit is coupled with a bus of the business server 20. The business server 30 and the client apparatus 40 may also be implemented with a similar hardware configuration to that of the business server 20.

The processor 21 controls the information processing of the business server 20. The processor 21 may be a multi-processor. The processor 21 is, for example, the CPU, the DSP, the ASIC, or the FPGA. The processor 21 may be a combination of two or more of the CPU, the DSP, the ASIC, and the FPGA.

The RAM 22 is a main memory device of the business server 20. The RAM 22 temporarily stores therein at least a portion of a program of an operating system (OS) or an application program executed by the processor 21. The RAM 22 also stores therein various data used for the processing performed by the processor 21.

The HDD 23 is an auxiliary storage device of the business server 20. The HDD 23 magnetically records and reads data to and from a built-in magnetic disk. The HDD 23 stores the OS program, the application program, and various data. The business server 20 may be provided with other types of auxiliary storage devices such as a flash memory or an SSD and be provided with a plurality of auxiliary storage devices.

The image signal processing unit 24 outputs an image to a display 51 coupled with the business server 20 in accordance with an instruction from the processor 21. A cathode ray tube (CRT) display or a liquid crystal display may be used as the display 51.

The input signal processing unit 25 acquires an input signal from an input device 52 coupled with the business server 20 and outputs the signal to the processor 21. For example, a pointing device such as a mouse or a touch panel or a keyboard may be used as the input device 52.

The medium reader 26 is an apparatus for reading a program or data recorded in a recording medium 53. For example, a magnetic disk such as a flexible disk (FD) or an HDD, an optical disk such as a compact disc (CD) or a digital versatile disc (DVD), or a magneto-optical (MO) disk may be used as the recording medium 53. Further, for example, a nonvolatile semiconductor memory such as a flash memory card may be used as the recording medium 53. The medium reader 26 may store a program or data read from the recording medium 53 in the RAM 22 or the HDD 23 in accordance with, for example, an instruction from the processor 21.

The communication adapter 27 is an interface for an access to a virtual volume through the SAN 50. For example, an iSCSI adapter or an FC adapter may be used as the communication adapter 27.

Figure 5:
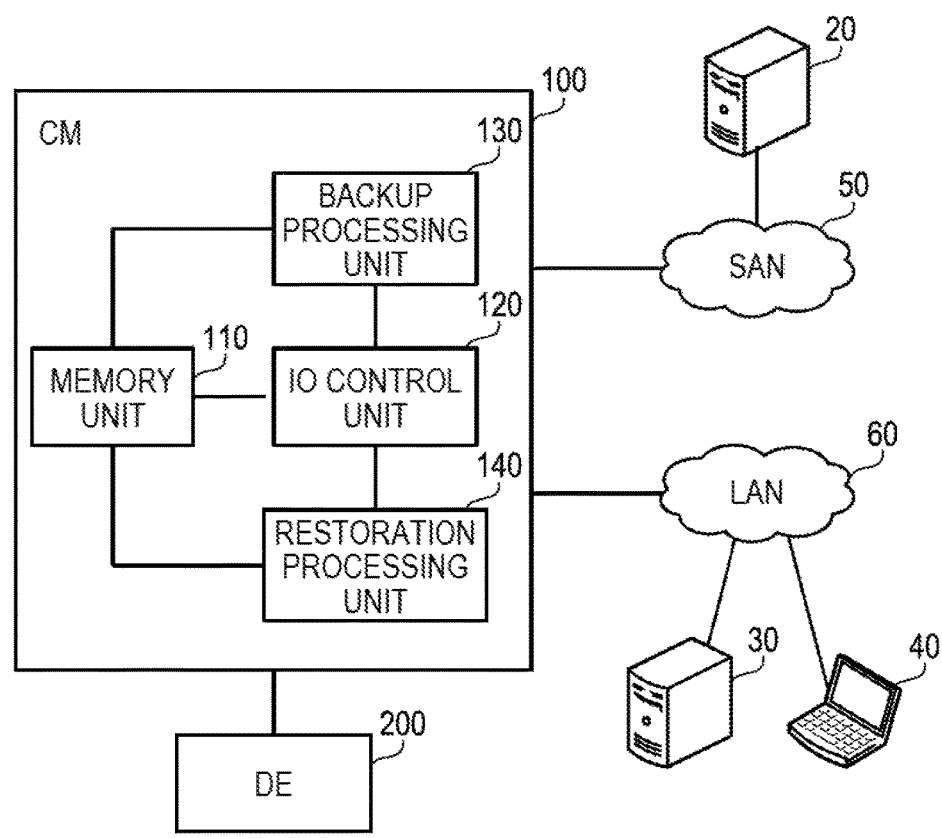
FIG. 5 is a diagram illustrating an exemplary functional configuration of the CM.

FIG. 5 is a diagram illustrating an exemplary functional configuration of the CM. The CM 100 includes a memory unit 110, an Input/Output (IO) control unit 120, a backup processing unit 130, and a restoration processing unit 140. The memory unit 110 is implemented as a memory area secured in, for example, the RAM 102 or the NVRAM 103. The IO control unit 120, the backup processing unit 130, and the restoration processing unit 140 are implemented by executing the program stored in the RAM 102 by the processor 101.

The memory unit 110 stores therein information for managing a backup of each logical volume in the DE 200. The CM 100 uses a snapshot technique in acquisition of the backup. Specifically, the CM 100 acquires a backup of an area to be backed up in the logical volume by the copy-on-write technique (all of data of the area to be backed up is not backed up, but only the data of the difference to which update is made is backed up). The memory unit 110 stores therein, for example, a bitmap table used for managing the data update performed in units of blocks or units of files.

The IO control unit 120 provides a shared area for storing data with respect to the business servers 20 and 30 and the client apparatus 40. The IO control unit 120 controls IO processing such as data recording or data reading for the block-based access from the business server 20. The IO control unit 120 controls IO processing of data for the file-based access from the business server 30 or the client apparatus 40. Specifically, the IO control unit 120 performs mapping of the designated file with the logical volume and the block when accessing the designated file. In general, the size of a file is larger than the size of a block. For that reason, a single file is stored in a logical volume over a plurality of blocks.

The backup processing unit 130 performs the backup processing for each logical volume. As described above, the copy-on-write technique is used in the backup. The backup processing unit 130 generates a bitmap table for managing a generation of the backup and information for managing a storage destination of the copied data and stores the generated bitmap table and information in the memory unit 110. The generation is a piece of information associated with the time represented by year, month, day, hour, minute, and second.

The backup processing unit 130 discriminates data structures of bitmap tables between the logical volumes for the block-based access and the logical volumes for the file-based access. For the data structure for the block-based access, a bitmap table in which presence/absence of data update are associated with units of blocks is used. For the data structure for the file-based access, a bitmap table in which presence/absence of data update are associated with units of metadata that is associated with each file is used. The backup processing unit 130 performs the generation management for the backup of each logical volume using a corresponding bitmap table. The metadata is information associated with a plurality of blocks in which the file is stored. An inode number managed by the file system or a hash value of a path of a file may be considered as the metadata. For example, the backup processing unit 130 may input the path of the file to a predetermined hash function to obtain the hash value.

When restoration of a certain logical volume to a certain generation is requested from another apparatus such as the client apparatus 40, the restoration processing unit 140 restores data of the corresponding logical volume at the corresponding generation on the basis of various tables generated by the backup processing unit 130.

FIG. 6 is a diagram illustrating an example of a bitmap table in units of blocks. A bitmap table 111 is stored in the memory unit 110. The bitmap table 111 is associated with a single logical volume prepared by the HDDs 201, 202, and 203. The bitmap table 111 includes items for a block number and update information.

The block number in the corresponding logical volume is registered in the item of the block number. A bitmap in which a bit indicating the presence/absence of update for each generation of data stored in each block is registered in the item of the update information. The bit of "0" indicates the absence of update and the bit of "1" indicates the presence of update (The same applies hereinafter). The bitmap is generated for each generation. For example, a bitmap 111a is for the first generation. A bitmap 111b is for the second generation. A bitmap 111c is for the third generation. The higher generation number indicates the newer generation (The same applies hereinafter).

For example, according to the bitmap 111a, bits of the block numbers "1" and "12" are respectively "0" and bits of the block numbers "2" and "13" are respectively "1". This indicates that the blocks having the block numbers "1" and "12" are not updated and the blocks having the block numbers "2" and "13" are updated from the timing of receiving an instruction to acquire a backup of the first generation with respect to the corresponding logical volume.

According to the bitmap 111b, bits of the block numbers "1", "2", and "13" are respectively "0" and a bit of the block number "12" is "1". This indicates that the blocks having the block numbers "1", "2", and "13" are not updated and the block having the block number "12" is updated from the timing of receiving an instruction to acquire a backup of the second generation with respect to the corresponding logical volume.

According to the bitmap 111c, bits of the block numbers "1", "2", and "12" are respectively "0" and a bit of the block number "13" is "1". This indicates that the blocks having the block numbers "1", "2", and "12" are not updated and the block having the block number "13" is updated from the timing of receiving an instruction to acquire a backup of the third generation with respect to the corresponding logical volume.

FIG. 7 is a diagram illustrating an example of a bitmap table in units of metadata. A bitmap table 112 is stored in the memory unit 110. For example, the bitmap table 112 is associated with a single logical volume prepared by the HDDs 204, 205, and 206. The bitmap table 112 includes items for metadata, a latest updated generation, and updated information.

The metadata associated with the file is registered in the item of the metadata. A uniquely allocated number is assumed as the metadata. The number may be, for example, an inode number or a hash value of a path of a file. A piece of information (updated generation information) indicating the latest updated generation of the file associated with the corresponding metadata is registered in the item of the latest updated generation. A bitmap in which the bit (identification information) indicating the presence/absence of update for each generation of the file associated with each metadata is registered in the item of the updated information. The bitmap is prepared for each generation. For example, a bitmap 112a is for the first generation. A bitmap 112b is for the second generation. A bitmap 112c is for the third generation. The generations denoted by the same numerical value in the bitmap table 111 and the bitmap table 112 are not necessarily be synchronized with each other.

For example, according to the bitmap 112a, bits of the metadata "1", "3", and "5" are respectively "0" and bits of the metadata "2" and "4" are "1". This indicates that the files associated with the metadata "1", "3", and "5" are not updated and the files associated with the metadata "2" and "4" are updated from the timing of receiving an instruction to acquire a backup of the first generation with respect to the corresponding logical volume.

According to the bitmap 112b, bits of the metadata "1", "2", "4", and "5" are respectively "0" and a bit of the metadata "3" is "1". This indicates that the files associated with the metadata "1", "2", "4", and "5" are not updated and the file associated with the metadata "3" is updated from the timing of receiving an instruction to acquire a backup of the second generation with respect to the corresponding logical volume.

According to the bitmap 112c, bits of the metadata "1", "2", "3", and "4" are respectively "0" and a bit of the metadata "5" is "1". This indicates that the files associated with the metadata "1", "2", "3", and "4" are not updated and the file associated with the metadata "5" is updated from the timing of receiving an instruction to acquire a backup of the third generation with respect to the corresponding logical volume.

Figure 8:
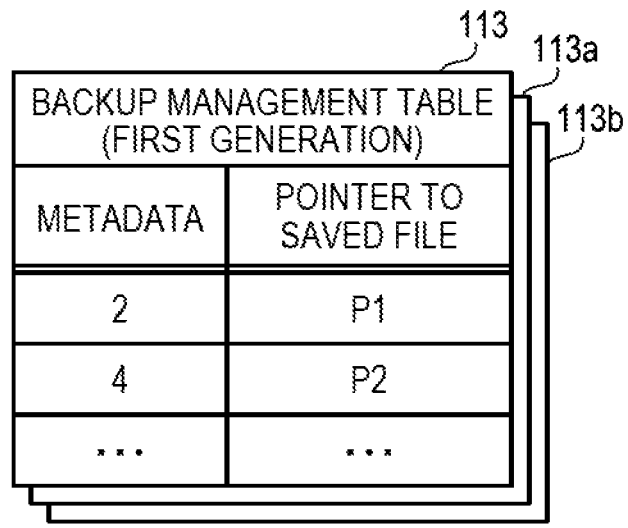
FIG. 8 is a diagram illustrating an example of a backup management table.

FIG. 8 is a diagram illustrates an example of a backup management table. Backup management tables 113, 113a, and 113b are stored in the memory unit 110. The backup management tables 113, 113a, and 113b correspond to information for managing the metadata of a copy of the file (referred to as a copied file) prepared when a certain file is updated. Each of the backup management tables 113, 113a, and 113b is prepared for each generation of each logical volume. The backup management tables 113, 113a, and 113b are used together with the bitmap table 112 as a set. The backup management tables 113, 113a, and 113b are associated with the first generation, the second generation, and the third generation in the bitmap table 112, respectively. Each of the backup management tables 113, 113a, and 113b includes items for metadata and a pointer to a file saved as the backup.

The metadata of a file (file of copy source) is registered in the item of the metadata. A pointer indicating a storing place of the copied data that is the backup of the corresponding file (file of copy source) is registered in the item of the pointer to the saved file.

For example, information indicating that the metadata is "2" and the pointer to the saved file is "P1" is registered in the backup management table 113. This indicates that a copied file is saved in a storage indicated by a pointer "P1" as a backup of the first generation of the file associated with the metadata "2". The metadata such as the inode number of the copied file may be used as the pointer. Otherwise, the pointer may be a path of the copied file.

The corresponding information is managed in the backup management tables 113, 113a, and 113b even when the backup is acquired for each block. However, such a case may be handled by a conventional technique, and thus, descriptions thereof will be omitted. Next, a procedure by the storage apparatus 10 will be described.

Figure 9:
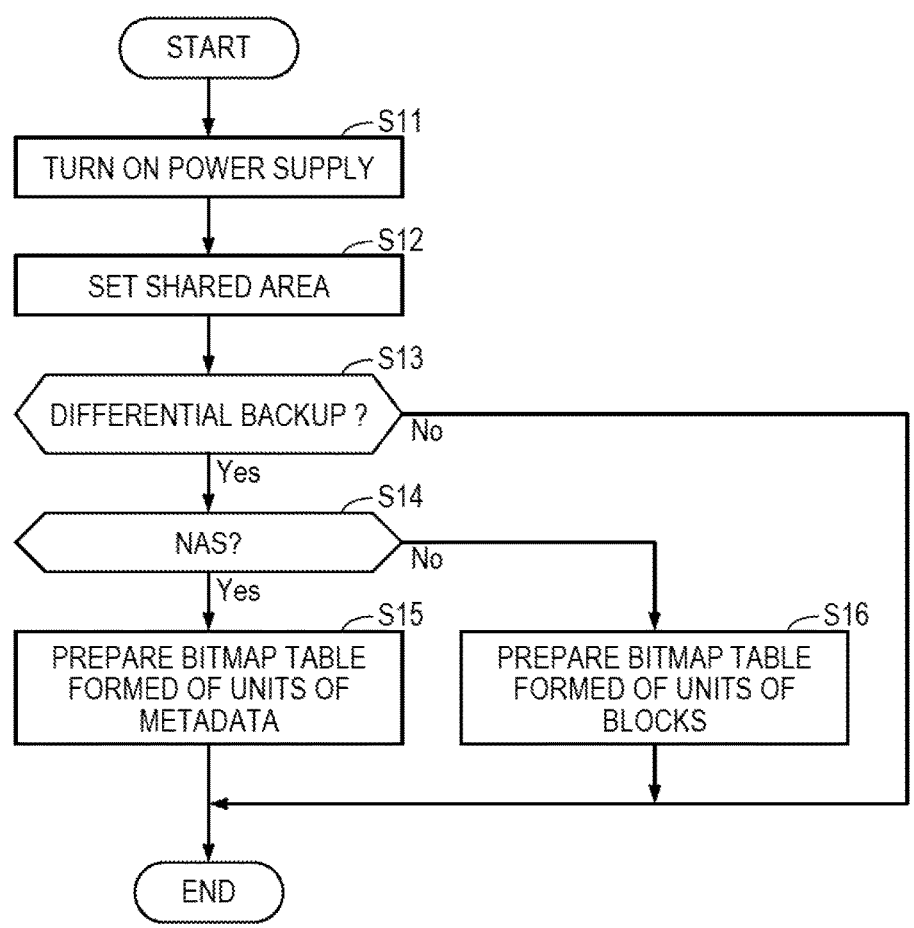
FIG. 9 is a flowchart illustrating an example of a process of setting a shared area.

FIG. 9 is a flowchart illustrating an example of a process of setting a shared area. In the following, the process illustrated in FIG. 9 will be described.

(S11) The storage apparatus 10 receives a power supplied by an operation of the user.

(S12) The IO control unit 120 performs setting of a shared area for each logical volume.

(S13) The backup processing unit 130 determines whether a differential backup (i.e., backup by the copy-on-write) is valid or not. When it is determined that the differential backup is valid, the process proceeds to S14. When it is determined that the differential backup is not valid, the process is ended. For example, the storage apparatus 10 stores in advance, in the NVRAM 103, setting information indicating whether the backup by the copy-on-write is to be acquired or not. The backup processing unit 130 may refer to the setting information to perform the determination at S13.

(S14) The backup processing unit 130 determines whether the storage apparatus 10 is used as the NAS or not. When it is determined that the storage apparatus 10 is used as the NAS, the process proceeds to S15. When it is determined that the storage apparatus 10 is not used as the NAS, the process proceeds to S16. For example, the backup processing unit 130 may confirm an activation situation of a service for NAS (e.g., NFS) by the IO control unit 120 to perform the determination at S14.

(S15) The backup processing unit 130 prepares the bitmap table 112 formed of units of metadata and stores the bitmap table 112 in the memory unit 110. In a case where backups are to be acquired for a plurality of logical volumes for the file-based access, the backup processing unit 130 prepares the bitmap table 112 for each corresponding logical volume. In the storage apparatus 10, as described above, a logical volume for the block-based access with respect to the business server 20 may be prepared. In a case where the logical volume for the block-based access exists, the bitmap table 111 formed of units of blocks is prepared with respect to the logical volume. Then, the process is ended.

(S16) The backup processing unit 130 prepares the bitmap table 111 formed of units of blocks and stores the bitmap table 111 in the memory unit 110. In a case where backups are to be acquired for a plurality of logical volumes for the block-based access, the backup processing unit 130 prepares the bitmap table 111 for each corresponding logical volume. Then, the process is ended.

Figure 10:
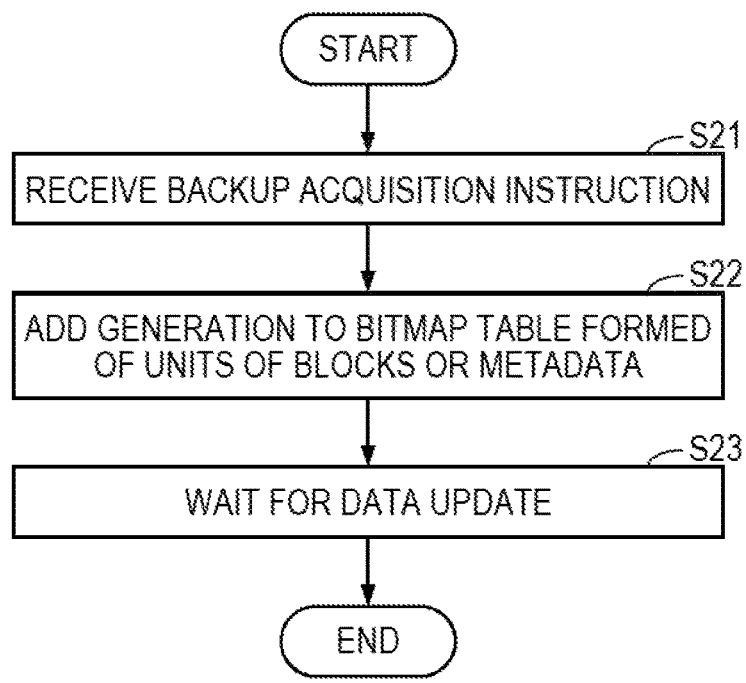
FIG. 10 is a flowchart illustrating an example of an addition of a generation.

FIG. 10 is a flowchart illustrating an example of an addition of a generation. In the following, the process illustrated in FIG. 10 will be described.

(S21) The backup processing unit 130 receives a backup acquisition instruction from another apparatus such as the client apparatus 40. The backup processing unit 130 may receive a backup acquisition instruction issued by a scheduler function of the CM 100 at a scheduled timing.

(S22) The backup processing unit 130 adds a bitmap for a new generation to the bitmap table 111 formed of units of blocks or the bitmap table 112 formed of units of metadata. The backup processing unit 130 may receive a backup acquisition instruction with respect to both the logical volume for the block-based access and the logical volume for the file-based access. In this case, the backup processing unit 130 adds the bitmap for new generation to both the bitmap table 111 and the bitmap table 112.

(S23) The backup processing unit 130 waits for an update of data with respect to the logical volume to be backed up.

Figure 11:
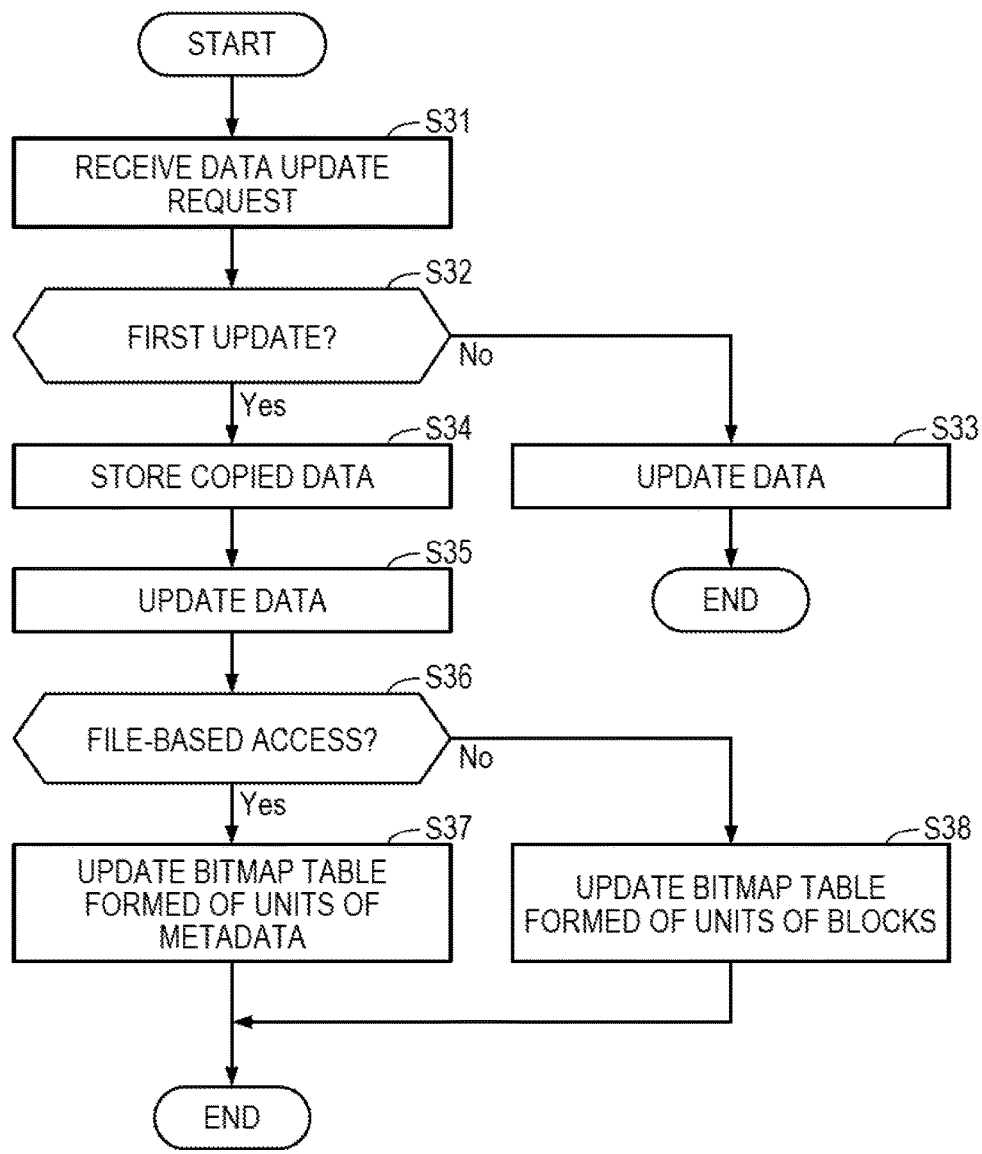
FIG. 11 is a flowchart illustrating an example of a process of updating a bitmap.

FIG. 11 is a flowchart illustrating an example of a process of updating a bitmap. In the following, the process illustrated in FIG. 11 will be described.

(S31) The IO control unit 120 receives a data update request. When the data update request is issued by the business server 20, the data update request corresponds to an update request (block-based access) designating a block number. When the data update request is issued by the business server 30 or the client apparatus 40, the data update request corresponds to an update request (file-based access) designating a file.

(S32) The backup processing unit 130 determines, on the basis of the data update request received by the IO control unit 120, whether an update to be performed is the first update in the current generation with respect to the data to be updated. When it is determined that the update is the first update, the process proceeds to S34. When it is determined that the update is not the first update, the process proceeds to S33. The backup processing unit 130 may determine whether an update to be performed is the first update in the current generation with respect to the data to be updated on the basis of the bitmap tables 111 and 112. For example, when the data update request is the file-based access, the backup processing unit 130 acquires the metadata of a file to be updated and confirms the corresponding bit of the current generation of the bitmap table 112. When the bit is "0", it indicates that the update is the first update. When the bit is "1", it indicates that the update is not the first update. The block-based access may be determined on the basis of the bitmap table 111 similar to the file-based access.

(S33) The IO control unit 120 performs a data update in accordance with the received data update request. Then, the process is ended.

(S34) The backup processing unit 130 generates a copy (copied data) of the data to be updated and stores the copy. For example, the backup processing unit 130 may use a predetermined storage area of the HDD accommodated in the DE 200 as a storing place.

(S35) The IO control unit 120 performs the data update in accordance with the received data update request.

(S36) The backup processing unit 130 determines whether the received data update is the file-based access. When it is determined that the received data update is the file-based access, the process proceeds to S37. When it is determined that the received data update is not the file-based access (i.e., block-based access), the process proceeds to S38.

(S37) The backup processing unit 130 updates the bitmap table 112 formed of units of metadata. Specifically, the backup processing unit 130 updates the bit, which is associated with the metadata of the file to be updated, from "0" to "1" with respect to the bitmap of the current generation on the bitmap table 112. The backup processing unit 130 prepares information indicating a correspondence relationship between the file to be updated and the copied file (file stored at S34). For example, the backup processing unit 130 prepares the backup management table illustrated in FIG. 8 manage, for each generation, a place of the copied file with respect to the file (file of copy source) to be updated. The backup processing unit 130 registers, in the bitmap table 112, the latest updated generation (current generation) with respect to the metadata of the file to be updated. Then, the process is ended.

(S38) The backup processing unit 130 updates the bitmap table 111 formed of units of blocks. Specifically, the backup processing unit 130 updates the bit, which is associated with the block to be updated, from "0" to "1" with respect to the bitmap of the current generation on the bitmap table 111. The backup processing unit 130 prepares information indicating a correspondence relationship between the block to be updated and the copy of the block to manage a place of the copied file with respect to the file to be updated for each generation. Then, the process is ended.

Next, a procedure of the restoration in the storage apparatus 10 will be described.

Figure 12:
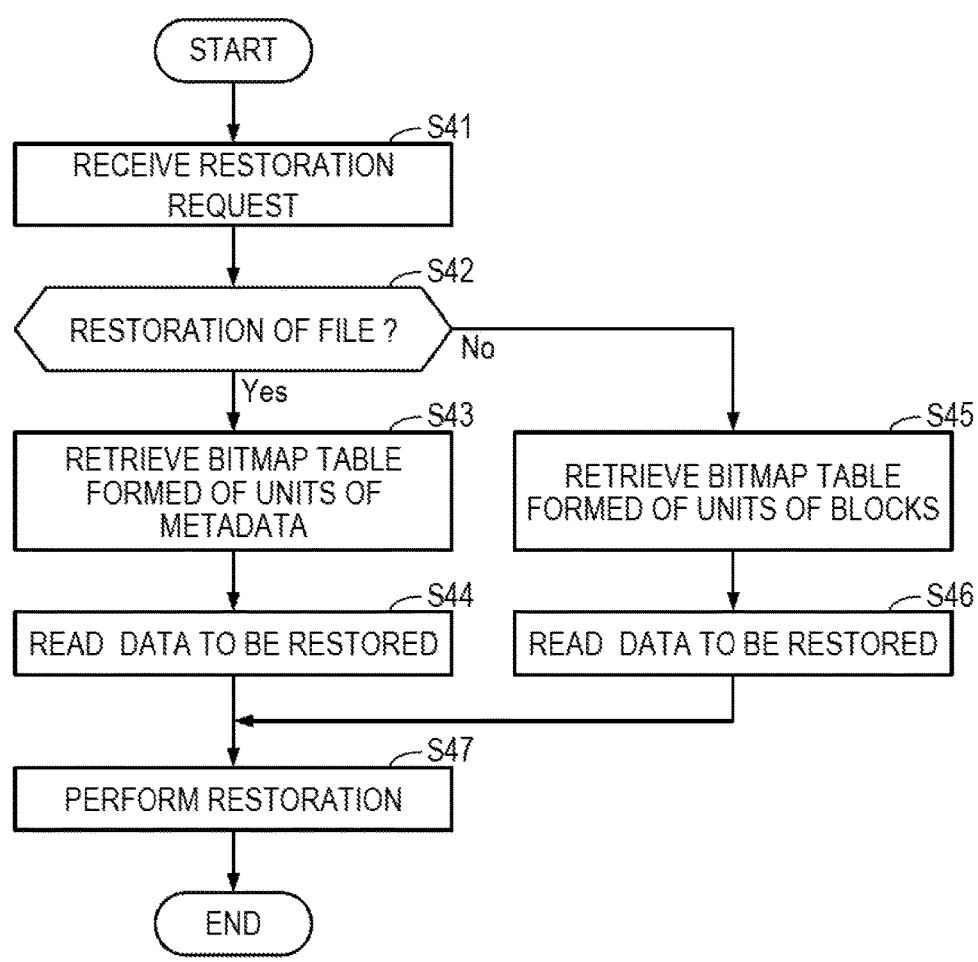
FIG. 12 is a flowchart illustrating an example of a process of restoration.

FIG. 12 is a flowchart illustrating an example of a process of the restoration. In the following, the process illustrated in FIG. 12 will be described.

(S41) The restoration processing unit 140 receives a request (restoration request) for restoration from another apparatus such as the client apparatus 40. The restoration request includes information regarding a logical volume to be restored and a generation.

(S42) The restoration processing unit 140 determines whether the restoration request requests restoration of a file or not. When it is determined that the restoration request requests restoration of a file, the process proceeds to S43. When it is determined that the restoration request does not request restoration of a file, the process proceeds to S45. For example, when the logical volume designated in the restoration request is a logical volume for the file-based access, the restoration processing unit 140 determines that the restoration request requests restoration of a file. When the logical volume designated in the restoration request is a logical volume for the block-based access, the restoration processing unit 140 determines that the restoration request does not request restoration of a file.

(S43) The restoration processing unit 140 retrieves the bitmap table 112 formed of units of metadata associated with the logical volume designated in the restoration request and identifies the file of the designated generation. At this time, the restoration processing unit 140 may use the information of the latest updated generation for each metadata registered in the bitmap table 112. For example, an attention is focused on a certain piece of metadata of the bitmap table 112. When a generation designated in the restoration request is greater than the latest updated generation of the metadata of interest, the restoration processing unit 140 sets the file of the latest updated generation as the data to be restored with respect to the metadata of interest. When the generation designated in the restoration request is equal to or less than the latest updated generation of the metadata of interest, for example, the restoration processing unit 140 retrieves generations in a descending order (toward older generations) from the generation designated in the restoration request. The restoration processing unit 140 identifies an updated generation, and sets a copied file backed up in the generation identified for the first time as the data to be restored. In a case where the updated generation is not identified when the generations are retrieved in the descending order, the generations are retrieved in an ascending order from the designated generation toward newer generations. The restoration processing unit 140 identifies an updated generation, and sets the copied file that is backed up from the generation identified for the first time as the data to be restored. When the bits of all of generations are "0" with respect to the metadata of interest, the update of the file associated with the metadata does not occurred, and thus, the file does not need to be restored. The restoration processing unit 140 may identify a storing place of the copied file in the generation associated with certain metadata on the basis of the backup management tables 113, 113a, and 113b.

(S44) The restoration processing unit 140 reads the file identified at S43 as the data to be restored on the basis of the backup management table of each generation stored in the memory unit 110. Then, the process proceeds to S47.

(S45) The restoration processing unit 140 retrieves the bitmap table 111 formed of block units associated with the logical volume designated in the restoration request and identifies data for each block of the designated generation.

(S46) The restoration processing unit 140 reads the data identified at S45 as the data to be restored.

(S47) The restoration processing unit 140 instructs the IO control unit 120 to record the data to be restored read at S44 or S46 to the designated logical volume. The IO control unit 120 records the data to be restored in the corresponding logical volume. In this way, the data stored in the corresponding logical volume is restored to a state of the generation designated by the restoration request.

As described above, the storage apparatus 10 manages the presence/absence of update of the corresponding file in units of metadata of the file to make it possible to further reduce the size of the bitmap table, as compared to managing the presence/absence of update in units of blocks.

Here, a case in which the file stored in the shared area for file is divided into blocks to be managed is considered. In this case, when the number of blocks to be managed is increased, the size of a table used for managing the updates becomes larger. In particular, a unified type storage apparatus 10 may be used as a file server and accessed from a plurality of apparatuses such as the business server 30 or the client apparatus 40. For that reason, there is a possibility that a range of blocks to be backed up or the number of generations is increased, as compared to a case where only the block-based access is performed to the storage apparatus 10, and thus, an increase in the size of the management information is likely to be significant.

Thus, according to the second embodiment, an update situation is managed in units of files using the bitmap table 112 formed of units of metadata. The update situation is managed in units of files to make it possible to further reduce the data size of the bitmap table 112, as compared to managing the update situation in units of blocks. As the amount of data of the information for managing the backup is reduced, it becomes possible to manage the backups for more generations.

As illustrated in S43, when the file to be restored is identified, the information of the latest updated generation registered in the bitmap table 112 is used in the storage apparatus 10. Accordingly, it is possible to identify the file to be restored at a high speed. In particular, when the latest generation in the bitmap table 112 is designated as the generation to be restored in the restoration request, a file to be restored may be identified regarding all the metadata on the basis of the latest updated generation. In this case, an effect of speed up becomes improved the most.

The information processing of the first embodiment may be implemented by causing the processor used as the control unit 2b to execute a program. The information processing of the second embodiment may be implemented by causing the processor 101 to execute the program. It may be considered that the storage control device 2 and the CMs 100 and 100a may be provided with a computer including a memory and a processor. The program may be recorded in a computer-readable recording medium.

For example, the program may be circulated by distributing a recording medium (e.g., recording medium 11) having recorded the program therein. The computer may download the program from other computers (e.g., business servers 20 and 30). The computer may store (install) the program, for example, a downloaded program or a program read from a recording medium, in a storage device such as the RAM 102 or the NVRAM 103, read the program from the corresponding storage device, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus, comprising:
a memory device configured to store therein first management information regarding a first backup for each generation of backup, the first backup being a backup of a file stored in a storage device, the first management information being generated by associating first identification information indicating a presence or absence of an update of the file with metadata of a uniquely allocated number of the file corresponding to a plurality of blocks where the file is stored in the storage device; and
a processor configured to:
generate, as the first management information, a bit map table formed of units of the metadata of the file by associating the first identification information with the metadata of the file;
receive a first request to perform a first update of updating the file;
store, upon receiving the first request, a first copy of the file before the first update in a predetermined first area of the storage device;
perform the first update upon storing the first copy;
register, as the first identification information, update information indicating the presence of the update of the file in the first management information stored in the memory in association with the metadata of the file; and
store storage information that identifies the predetermined first area of the storage device in the memory device,
wherein the processor is configured to perform a control operation of the file including generating the bit map table, receiving the first request, storing the first copy of the file, performing the first update, registering update information and storing storage information in units of metadata of the file.

2. The storage apparatus according to claim 1, wherein the processor is further configured to
receive an instruction to acquire a backup of the file for a new generation, and
generate, upon receiving the instruction, the first management information for the new generation.

3. The storage apparatus according to claim 1, wherein the memory device is further configured to
store therein second management information regarding a second backup for each generation of backup, the second backup being a backup of a block of the storage device, the second management information being generated by associating second identification information indicating a presence or absence of an update of the block with an identifier identifying the block, and
the processor is further configured to
receive a second request to perform second update of updating the block,
store, upon receiving the second request, a second copy of the block before the second update in a predetermined second area of the storage device,
perform the second update upon storing the second copy, and
register, as the second identification information, information indicating the presence of the update of the block in the second management information in association with the identifier.

4. The storage apparatus according to claim 3, wherein the processor is further configured to
manage using the first management information a situation of updating the file for a first storage area of the storage device, and
manage using the second management information a situation of updating the block for a second storage area of the storage device.

5. The storage apparatus according to claim 1, wherein the processor is further configured to
register updated-generation information in association with the metadata of the file when registering the update information, the updated-generation information indicating a current generation,
store the storage information indicating the predetermined first area of the storage device in association with the metadata of the file and the current generation, and
retrieve the file on basis of the updated-generation information when the file is to be restored.

6. The storage apparatus according to claim 1, wherein the metadata of the file is an inode number of the file managed by a file system or a hash value of a path of the file in the storage device.

7. A non-transitory computer-readable recording medium having stored therein a program that causes a computer to execute a process, the process comprising:
generating, as first management information, a bit map table formed of units of metadata of a file stored in a storage device by associating first identification information indicating a presence or absence of an update of the file stored in the storage device to the metadata of a uniquely allocated number of the file corresponding to a plurality of blocks where the file is stored in the storage device;
storing the first management information in a memory device;
receiving a first request to perform a first update of updating the file stored in the storage device;
storing, upon receiving the first request, a first copy of the file before the first update in a predetermined first area of the storage device;
performing the first update upon storing the first copy of the file in the predetermined first area of the storage device;
registering, in the first management information stored in the memory device regarding a first backup for each generation of backup, update information indicating the presence of the update of the file in association with metadata of the file corresponding to the plurality of blocks of the file, as the first identification information, the first backup being a backup of the file; and
storing storage information that identifies the predetermined first area of the storage device in the memory device,
wherein the process including the generating, storing the first management information, receiving, storing the first copy of the file, performing the first update, registering update information and storing storage information is performed in units of metadata of the file.

8. The non-transitory computer-readable recording medium according to claim 7, wherein the metadata of the file is an inode number of the file managed by a file system or a hash value of a path of the file in the storage device.

* * * * *